United States Patent [19]

Barnes

[11] Patent Number: 4,989,669
[45] Date of Patent: Feb. 5, 1991

[54] APPARATUS AND PROCESS FOR EXCHANGING HEAT BETWEEN SOLID PARTICLES AND A HEAT EXCHANGE MEDIUM

[75] Inventor: Peter H. Barnes, The Hague, Netherlands

[73] Assignee: Shell Oil Company, Houston, Tex.

[21] Appl. No.: 339,744

[22] Filed: Apr. 18, 1989

[30] Foreign Application Priority Data

May 3, 1988 [GB] United Kingdom ............... 8810390

[51] Int. Cl.$^5$ .................... B01J 38/30; B01J 38/32; F28C 3/10
[52] U.S. Cl. ..................... 165/104.16; 165/104.18; 502/41; 502/44
[58] Field of Search .............. 165/104.16, 104.18; 502/41, 44

[56] References Cited

U.S. PATENT DOCUMENTS 4,582,120  4/1986  Walters et al. ............... 165/104.16
4,744,413  5/1988  Klaren et al. ................ 165/104.16
4,861,562  8/1989  Rowe .......................... 165/104.16

FOREIGN PATENT DOCUMENTS 0105980  4/1984  European Pat. Off.

Primary Examiner—Albert W. Davis, Jr.
Attorney, Agent, or Firm—Kimbley L. Muller

[57] ABSTRACT

An apparatus is disclosed for exchanging heat between solid particles and a heat exchange medium, comprising a housing which housing is provided with aeration means with an inlet for an aeration fluid, with an outlet opening, whereby an aeration zone is defined between the aeration means and the outlet opening, and with heat exchange means with at least one inlet and at least one outlet for the heat exchange medium and extending in at least part of the aeration zone, which apparatus further comprises an inlet conduit for solid particles that extends into the aeration zone. Use of the apparatus for the transfer of heat between a heat exchange medium and solid particles is also disclosed.

6 Claims, 2 Drawing Sheets

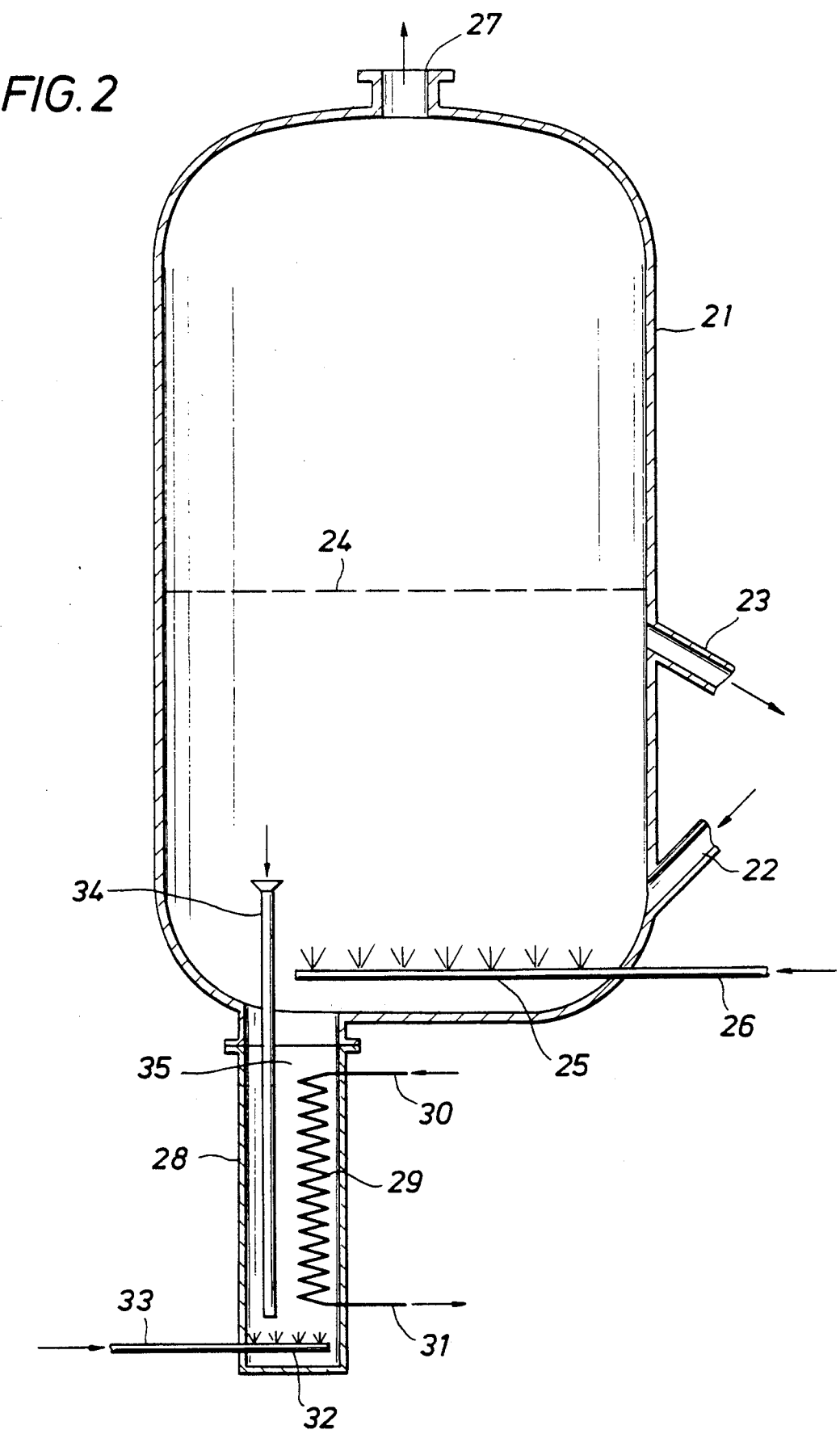

APPARATUS AND PROCESS FOR EXCHANGING HEAT BETWEEN SOLID PARTICLES AND A HEAT EXCHANGE MEDIUM

FIELD OF INVENTION

The present invention relates to an apparatus and a process for exchanging heat between solid particles and a heat exchange medium and to the use of such an apparatus in a fluid catalytic cracking (FCC) process.

BACKGROUND OF INVENTION

In EP-B-O 105 980 a heat exchange apparatus for use in a FCC process is described which comprises a housing of vertical orientation in which in the upper part an inlet opening for solid particles is provided and in which near the bottom fluidization means are arranged. The inlet opening communicates with a reservoir of solid particles to be cooled, in particular a fluidized bed of fluid catalytic cracking catalyst. Heat exchange tubes are provided at least in the space defined between the fluidization means and the inlet opening. According to this reference there are two ways for the cooled solid particles to be withdrawn. A first embodiment provides the withdrawal of solid particles at the bottom of the housing via conduit and the cooled solid particles are subsequently re-introduced into the reservoir of solid particles by means of a standpipe and riser system. In a second embodiment cooled solid particles are withdrawn via the inlet opening. This is accomplished by the creation of a backmixing zone in the housing by means of the use of the fluidization gas entering the housing via the fluidization means.

The second embodiment eliminates the necessity to use expensive conduits, standpipes, riser pipes and auxiliary means such as valves and expansion joints. However, the mass transfer in this second embodiment is slower than in the first. Hence, the duty of the heat exchange tubes is worse. Moreover, it will be clear that mass transfer of cooled solid particles from the housing to the reservoir and hence the heat exchange duty of the apparatus will be less controllable than in the first embodiment.

BRIEF DESCRIPTION OF THE INVENTION

The present invention provides an improvement over the above apparatus by which the mass flow and hence the heat exchange performance of the apparatus is enhanced compared to the above second embodiment, whereas no need exists for expensive standpipes, valves, joints and the like. The improvement is attained by the provision of an inlet conduit for the solid particles which extends into the housing.

DETAILED DESCRIPTION OF THE INVENTION

Accordingly, the present invention provides an apparatus for exchanging heat between solid particles and a heat exchange medium, comprising a housing which housing is provided with aeration means with an inlet for an aeration fluid, with an outlet opening, whereby an aeration zone is defined between the aeration means and the outlet opening, and with heat exchange means with at least one inlet and at least one outlet for the heat exchange medium and extending in at least part of the aeration zone, which apparatus further comprises an inlet conduit for solid particles that extends into the aeration zone.

By means of the aeration fluid a decrease in the density occurs, so that there will be a flow of a low-density mixture of solid particles and aeration fluid out of the housing and a flow of high-density solid particles entering the housing through the inlet conduit. By adapting the introduction rate of the aeration fluid the mass flow can easily be controlled. When in operation, the housing is usually in a vertical orientation. Accordingly, the present invention further provides a process for exchanging heat between solid particles and a heat exchange medium, comprising passing the solid particles downwards via an inlet conduit for solid particles into an aeration zone, aerating the solid particles in the aeration zone by introducing an aeration fluid into the aeration zone, thereby decreasing the density of the mixture of solid particles and aeration fluid, allowing the mixture with the decreased density to pass upwards between the inlet conduit and the housing along the inlet conduit and heat exchanger means, through which the heat exchange medium is passed, thereby allowing for the transfer of heat between the solid particles and the heat exchanger medium, and withdrawing the mixture of solid particles and aeration fluid via an outlet arranged at the top of the aeration zone.

The housing can have various shapes, depending on the spot where it is to be positioned or on the space that is available to it. Hence, the housing may have such shapes that its cross-section is square, oblong, elliptical or circular, and the housing may be in the shape of a block, a cone, a sphere or any cylinder. Preferably, the housing is substantially cylindrical. Such a shape allows for sufficient space for heat exchange means and avoids the occurrence of dead spots.

Through the outlet opening in the housing the mixture of solid particles and aeration fluid is withdrawn from the housing. It is preferably substantially circular or elliptical. When the housing has a vertical orientation, the outlet opening is suitably arranged at the top of the aeration zone.

The inlet conduit for solid particles extends into the housing, in particular into the aeration zone. It may enter the housing at various places but preferably it enters the housing at a place opposite to the aeration means. Advantageously, at least the part of the inlet conduit that extends into the aeration zone, is arranged coaxially to the housing, thereby allowing for a uniform distribution of the solid particles over the cross-section of the housing. From a constructional point of view it is preferred that not only this part, but also the rest of the inlet conduit is coaxially arranged to the housing. Preferably, the inlet conduit enters the housing via the outlet opening. More preferably the inlet conduit is concentrical with the outlet opening, thereby providing a substantially annular opening between the housing and the inlet conduit as the outlet for the solid particles and the aeration fluid.

The aeration means can be any conventional means for introducing an aeration fluid into the housing, such as a grid through which aeration fluid is introduced. Preferably, the aeration means with aeration fluid inlet are arranged as a bundle of aeration conduits with on one end or more perforations acting as the aeration means, and on the other end a connection to a source for the aeration fluid. These conduits may be arranged in the housing. The preferred aeration fluid is air.

The aeration zone may suitably comprise secondary aerations means which are present in the aeration zone. By using such secondary aeration means the aeration rate in the aeration zone can be increased and thus the mass transfer can be enhanced. The secondary aeration means may comprise a separate grid, or conduits that debouche into the aeration zone. Preferably, the secondary aeration means is provided by one or more perforations in the side wall of the aeration conduits that are described above.

The heat exchange means can be any conventional device for transferring heat from one medium to another. So, it is possible to provide plates or coils as the heat exchange means. Preferably, the heat exchange means is arranged as a bundle of tubes, thereby facilitating the solution to expansion :r contraction problems. Even more preferred the heat exchange means is carried out as tubes of the bayonet type wherein tubes are arranged into one another and wherein one end of the tubes is not connected to other components of the heat exchanger means such as a manifold serving as inlet and/or outlet means for the heat exchange medium. Such a construction minimizes any problem that might occur due to expansion or contraction of the heat exchanger components. The preferred heat exchange medium comprises water and/or steam.

The apparatus according to the invention is suitably used for the transfer of heat between a heat exchange medium and solid particles. It is preferably used for cooling solid particles. Advantageously, the apparatus according to the invention is used in a fluid catalytic cracking process, cooling spent FCC catalyst particles which are regenerated. Spent FCC catalyst particles are catalyst particles that have been used in the FCC reactor to crack a hydrocarbonaceous feedstock thereby allowing for coke to be deposited onto them. The coke-containing particles are subsequently passed to a regenerator in which at least part of the coke is burned off. The thus regenerated catalyst particles are then again introduced into the FCC reactor.

When used in a fluid catalytic cracking process the apparatus according to the invention is suitably connected to the bottom of a fluid catalytic cracking regenerator. The use of the apparatus according to the invention in the regenerating process allows for a higher circulation rate of the catalyst particles through the regenerator, through the FCC reactor and back and/or for a complete combustion of the coke on the spent particles to carbon dioxide without incurring the risk of overheating the catalyst particles.

BRIEF DESCRIPTION OF THE DRAWING

FIG. 2 shows schematically the arrangement of an apparatus according to the invention in the FCC regenerator.

DETAILED DESCRIPTION OF THE DRAWING

Figure 1:
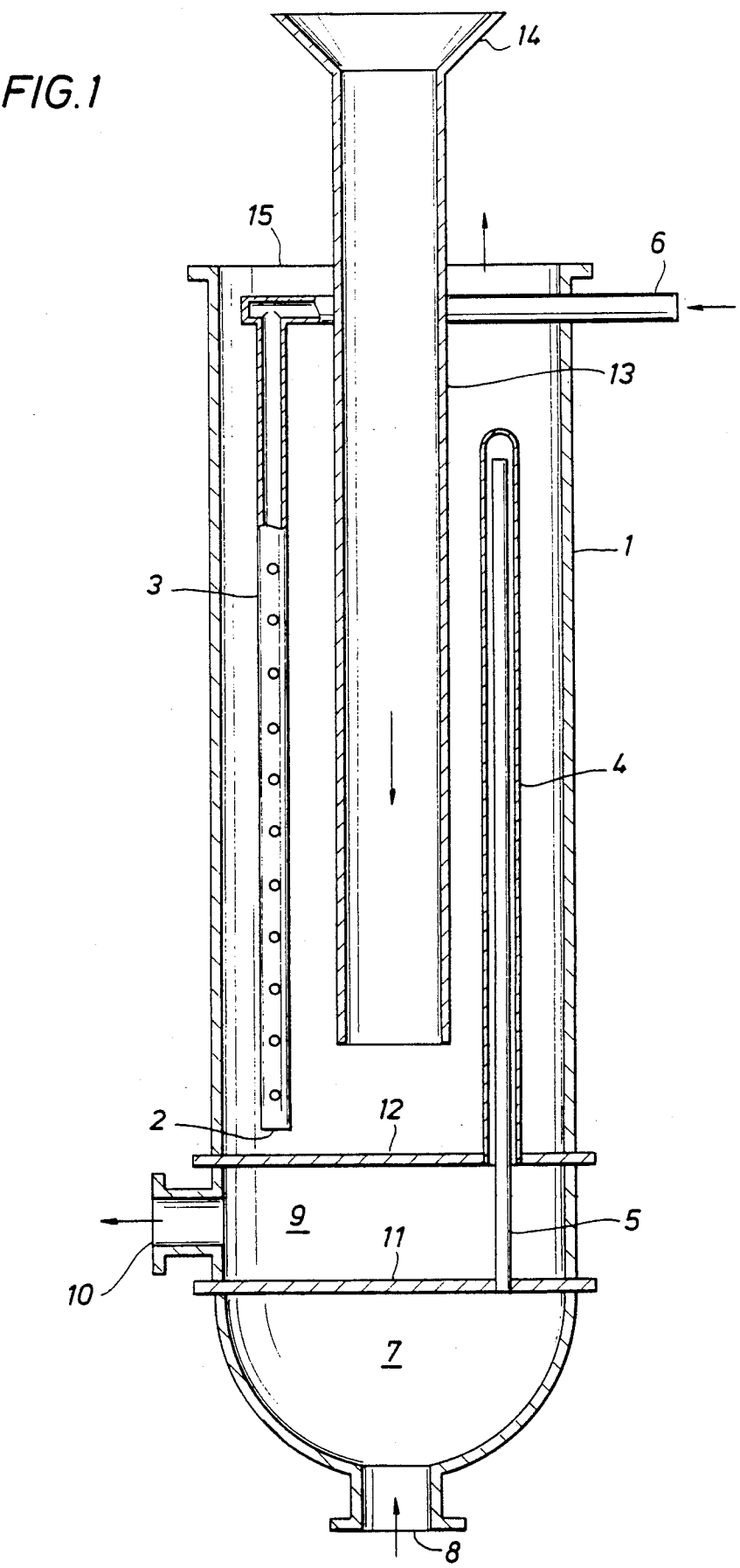
FIG. 1 shows a schematic cross-section of an embodiment of the apparatus according to the invention.

In FIG. 1 an apparatus is shown, comprising a housing (1), which housing comprises an aeration means (2,3), heat exchange means (4,5), and an outlet opening (15). The aeration means shown comprises the outlet 2 of a tube 3 which outlet is arranged at the bottom end of the tube 3. In the embodiment shown the outlet 2 is at the bottom of the tube 3. It will be clear that the tube may be provided with one or more perforations in the side wall of the tube instead which perforations then may serve as secondary aeration means. The tube 3 is connected with an inlet manifold 6. Together the tube 3 and the manifold 6 serve as inlet for aeration fluid. The figure only shows one aeration tube. It is evident that the apparatus according to the invention will be provided with a multitude thereof. The heat exchange means comprises a bayonet type heat exchange system. It comprises an outer tube 4 and an inner tube 5. The inner tube 5 is in communication with an inlet conduit 8 via an inlet reservoir 7. The outer tube 4 communicates with an outlet conduit 10 via an outlet reservoir 9. The reservoirs 7 and 9 are defined by the housing 1 and walls 11 and 12. The figure only shows one set of an inner and outer tube. It is evident that in practice the apparatus will contain many of such sets. Both the aeration means/inlets and the heat exchange means may be fastened to the housing by securing means (not shown). The apparatus is further provided with an inlet conduit for solid particles 13. This conduit may be provided with a collecting means 14 having the shape of an inverted truncated cone.

The apparatus operates as follows. Via the collecting means 14 and the inlet conduit 13 solid particles, in particular FCC catalyst particles, are passed into the housing 1 and more in particular into the space defined between the aeration means 2 and the outlet opening 15, indicated as aeration zone. By the introduction of aeration medium via the aeration means 2 the density of the solid particles-aeration fluid mixture is lowered when compared with the density of the solid particles entering the housing via the inlet conduit 13. Thereby an upward flow is accomplished of the particles along the heat exchanger system and the inlet conduit 13. During the contact with the heat exchange system the upwardly moving particles are subjected to heat exchange with a heat exchange medium. The heat exchange medium is passed via inlet 8 and reservoir 7 into the inner tube 5 debouching into the outer tube 4. In tube 4 the heat exchange medium is passed downwards and in the meantime heat exchange can occur between the particles and the heat exchange medium. The medium then enters the outlet reservoir 9 and is withdrawn via the outlet conduit 10. When steam of a relatively high pressure, e.g. 40-100 bar is produced, the wall 12 is preferably curved to withstand such pressures. The particles moving upward are discharged from the housing via the outlet opening 15.

FIG. 2 shows a fluid catalytic cracking regenerator 21 comprising an inlet for spent catalyst 22 and an outlet for regenerated catalyst 23. The level of the catalyst bed in the regenerator 21 is indicated by the dotted line 24. Via a conduit 26 a fluidization fluid, generally air, is passed to a fluidization grid 25, and the catalyst particles in the regenerator are fluidized while coke is burned off from them. Fluidization fluid and combustion gases are discharged from the regenerator via outlet 27. Between the outlet 27 and the catalyst level 24 separation means such as cyclones may be provided. At the bottom of the regenerator an apparatus according to the present invention is arranged. The apparatus comprises a housing 28. In the housing an aeration means is present. In the drawing the aeration means is indicated as an aeration grid. Aeration fluid, e.g. air, is passed to the aeration means via a line 33. The housing further comprises a heat exchange means 29, indicated as a coil, through which a heat exchange medium is passed via an inlet line 30 and an outlet line 31. From the catalyst bed an inlet conduit 34 for catalyst particles stretches until into the housing.

The embodiment of FIG. 2 operates as follows. Spent FCC catalyst particles are passed from a reactor (not shown) to the regenerator via the inlet 22. The catalyst particles are fluidized and coke on the particles is combusted by means of air which also serves as the fluidization fluid, the air being introduced into the regenerator via fluidization means 25. Catalyst particles enter the inlet conduit 34 and due to the aeration at the bottom of the housing 28 a lowering of the density of the matter at the bottom is accomplished and this matter, i.e. a mixture of catalyst particles and aeration fluid, is forced upwards between the inlet conduit 34 and housing 1 and along the heat exchange means 29, thereby allowing for heat to be transferred between the catalyst particles and the heat exchange medium passed through the means 29. When the mixture of catalyst particles and aeration fluid reaches the outlet opening 35 the aeration fluid is dissipated.

What we claim as our invention:

1. An apparatus for regenerating spent solid catalyst particles with indirect heat exchange means which comprises a housing containing an aeration zone, a first inlet means comprising a bundle of aeration tubes having openings in said end of said tubes and one or more perforations in said tubes for introduction of an aeration fluid through an open end in said first inlet means, an outlet means for passage of regenerated catalyst and spent aeration fluid from said housing, a second inlet means having two extremes for introduction of spent solid catalyst particles and an indirect heat exchange means situated in said housing wherein cooling fluid is entered to the indirect heat exchange means and warmed cooling fluid is withdrawn from said indirect heat exchange means and from said housing through a fluid withdrawal means wherein said open end of said first inlet means and said outlet means are situated to define said aeration zone and wherein said second inlet means has an inlet at one extreme for entry of spent catalyst to said second inlet means and an outlet at the other extreme to pass said spent solid catalyst particles to said housing at a point within said aeration zone.

2. The apparatus of claim 1 wherein said housing is substantially cylindrical.

3. The apparatus of claim 1 wherein said second inlet means is arranged in coaxial placement with respect to said housing.

4. The apparatus of claim 1 wherein said second inlet means is arranged in coaxial placement with respect to said outlet means for said regenerated catalyst and said spent aeration fluid.

5. The apparatus of claim 1 wherein said heat exchange means comprises a bundle of heat exchange tubes.

6. The apparatus of claim 1 wherein said apparatus communicates with a fluid catalytic cracking regeneration zone.

* * * * *